United States Patent [19]
Brociner

[11] 3,710,941
[45] Jan. 16, 1973

[54] METHOD AND APPARATUS FOR TREATING SEWAGE
[75] Inventor: Haskal Brociner, Chicago, Ill.
[73] Assignee: FMC Corporation
[22] Filed: April 8, 1971
[21] Appl. No.: 132,435

[52] U.S. Cl. ..................210/84, 210/220, 210/519, 210/534
[51] Int. Cl. ...............................B01d 21/24
[58] Field of Search..........210/83, 84, 220, 519, 534

[56] References Cited

UNITED STATES PATENTS

| | | | |
|---|---|---|---|
| 2,502,142 | 3/1950 | Gehle | 210/519 X |
| 2,537,904 | 1/1951 | McAllister, Jr. | 210/220 X |
| 3,297,567 | 1/1967 | Tapleshan | 210/220 X |

*Primary Examiner*—John Adee
*Attorney*—Dressler, Goldsmith, Clement & Gordon

[57] ABSTRACT

Elimination of heavy solids such as grit from sewage streams prior to introduction into treatment tanks is necessary because such solids interfere with normal operations. Substantially all of the heavy solids, irrespective of particle size are removed by a process and apparatus wherein raw sewage is introduced into a tank, the preferred form of which has a bottom sloping downwardly from the far side to a trough adjacent a first side wall, with even distribution along said first side wall, a predetermined small range of liquid level variation is maintained by flowing effluent sewage over a weir extending above the full length of the top of the side wall opposite said first side wall, air is introduced with even distribution adjacent to said trough and along said first side wall to induce circulatory flow of liquid and light weight solids upwardly and then in the direction of said opposite side wall, turning the circulatory flow direction downwardly toward the tank floor by a baffle spaced from said opposite side wall and positioned transverse to the direction of liquid flow through said tank, to effect separation of light weight solids and flowing the sewage suspension under said baffle and upwardly for removal by flow over said weir.

5 Claims, 2 Drawing Figures

PATENTED JAN 16 1973  3,710,941

INVENTOR
HASKAL BROCINER

BY
ATTORNEYS

METHOD AND APPARATUS FOR TREATING SEWAGE

This invention relates to a method and apparatus for treating sewage. More particularly, it relates to a method and apparatus for separating from a flowing liquid stream grit and other sedimentary, abrasive matter, which does not readily lend itself to the general methods of classification or sedimentation. Still more particularly, it is concerned with means for producing a liquid sewage containing sewage solids to be subsequently treated, from a grit tank with substantially all grit removed therefrom.

Briefly, the method for removal of grit from sewage containing relatively light organic matter, heavier but relatively small particles of grit and relatively heavy particles of grit comprises the steps of flowing said influent sewage into said tank with a uniform distribution along a first side wall positioned transverse to the direction of liquid flow, introducing air into said sewage with uniform distribution along the side wall supporting the inlet for influent sewage to create conditions which will cause heavy grit to settle out to an accumulation zone adjacent to and parallel to the side wall supporting said sewage inlet and to cause sewage still containing light organic matter and small particles of grit to flow upwardly and crosswise of said tank, positioning a baffle in said tank transverse to the direction of liquid flow therethrough and adjacent the side wall topped by a liquid outlet, to intercept the liquid flow and to cause the flow to turn downwardly whereby light grit is subjected to downward movement in addition to gravity to cause it to deposit on the tank bottom, again reversing the direction of flow of the sewage and the suspended light organic matter to an upwardly direction by passage under the baffle and flowing upwardly to an outlet supported by and extending the full length of said side wall and removing grit solids from said accumulation zone.

The heavy solids in a sewage stream, such as grit, sand and gravel have been removed heretofore by means of grit chambers. The removal of sewage solids from the grit tank depended upon the circulation of the sewage induced by air forced into the sewage adjacent the sewage inlet of the tank. As disclosed in Morgan U.S. Pat. No. 2,532,457, the circulation of the liquid sewage serves to keep the organic matter and light grit particles in suspension and separate from the heavy grit material. The introduction of gas in the Morgan apparatus which suspends light grit as well as organic matter, creates the problem of light grit carrying into the vicinity of an overflowing sewage outlet weir, thus lowering the grit separation efficiency. As disclosed in Tapleshay U.S. Pat. No. 3,297,567, the influent sewage is introduced through an inlet in a longitudinal side adjacent one end of the tank, air is introduced along a portion of the longitudinal side of the tank in an area approaching the outlet end of the tank and a baffle is positioned adjacent the outlet end of the tank transverse to the direction of liquid flow, and parallel to the liquid circulation.

The turbulence created by the introduction of gas adjacent the baffle and the increased velocity of liquid flow in a spiral path adjacent the baffle are counteractants to the gravity settling of solids in the zone behind the baffle and result in the carryover of significant amounts of light weight grit with the sewage suspension.

Now it has been discovered that inlet means spanning the full length of and adjacent or near the top of one of the side walls, such as a weir, a continuous port or a multiplicity of ports, enables better flow distribution and in conjunction with aeration means effects elimination of any strong individual liquid streams flowing from the inlets and carrying grit in the direction of the outlet means and parallel liquid outlet means results in lower head losses, more even washing, smaller fluctuation in water level and more even air flow with a new result of even grit distribution and substantially complete settling out of grit due to a combination of gravity and downward flow of suspension in front of and along the baffle caused by the break in the circulation pattern by the baffle.

The method of removing substantially all the heavy solids from sewage containing relatively light organic matter and lightweight solids of specific gravity greater than that of said organic matter, i.e., heavier but relatively small particles of grit and relatively heavy particles of grit comprises flowing said sewage into said tank whose floor terminates in an accumulation zone for solids parallel to and adjacent a first side wall with uniform distribution along said first side wall, said wall being positioned transverse to the direction of liquid flow in said tank, introducing air into said sewage at a predetermined pressure adjacent said first side wall with uniform distribution along the length of said first side wall in an amount to induce liquid containing light organic matter and lightweight solids of specific gravity greater than said organic matter to flow upwardly initially and then toward a second side wall opposite said first side wall while relatively heavy particles settle directly to said accumulation zone, and when said flow approaches said second side wall, interrupting the circulatory flow and directing it downwardly to the tank floor by a baffle positioned adjacent said second side wall to effect separation of heavier but relatively small particles of grit, which tank floor preferably slopes downwardly from the point below the baffle toward said accumulation zone for solids positioned below said area of introduction of air and parallel to and adjacent said first side wall from which zone accumulated solids can be independently removed, flowing the sewage, minus the separated solids, under the baffle and upwardly between said baffle and said second side wall for removal by flow over a weir extending the full length of said second side wall and adapted to maintain a predetermined limited variation in liquid level in said tank.

The apparatus for effecting the grit separation, i.e., for removing grit and other particulate solids of relatively high specific gravity from a liquid containing same in suspension comprises a tank having a sloping bottom and a plurality of end and side walls, inlet means spanning the full length of one of said side walls for uniform distribution of influent suspension, a trough in said bottom extending completely along said tank adjacent said side inlet wall, an overflow weir for maintaining a desired level of liquid in said tank extending the full length of an positioned at the top of the side wall opposite said inlet wall, and an outlet for the liquid communicating therewith, means for introducing air into the body of liquid from a region above said trough extending the full length of and adjacent said inlet wall to circulate the liquid in a generally vertical plane in the direction of said overflow weir, and to wash heavy solids which settle out of said liquid along said tank bottom sloping from said outlet wall to said trough, conveying means for removing solids from said trough, a baffle extending completely along said tank parallel to said wall topped by said overflow weir having its upper edge extending above the maximum liquid level and its lower edge spaced adjacent said floor to provide an exit for liquid flow upwardly behind said baffle to said outlet, and a fillet with surface extending downwardly from said side wall topped by said weir to a point below the lower edge of said baffle.

The structure by means of which the above-described method of operation is carried out with the advantages attained, is described in the following detailed description of a preferred form of apparatus for use in treating sewage in accordance with the instant invention, is illustrated in the accompanying drawings, in which.

Figure 2:
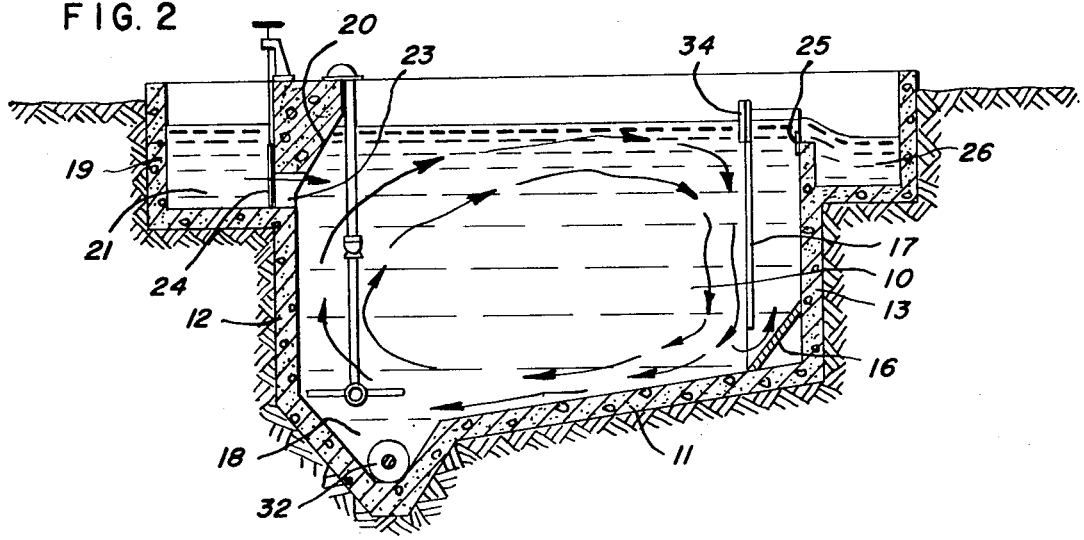
FIG. 2 is a cross section view along the line 2—2 of FIG. 1.
Figure 1:
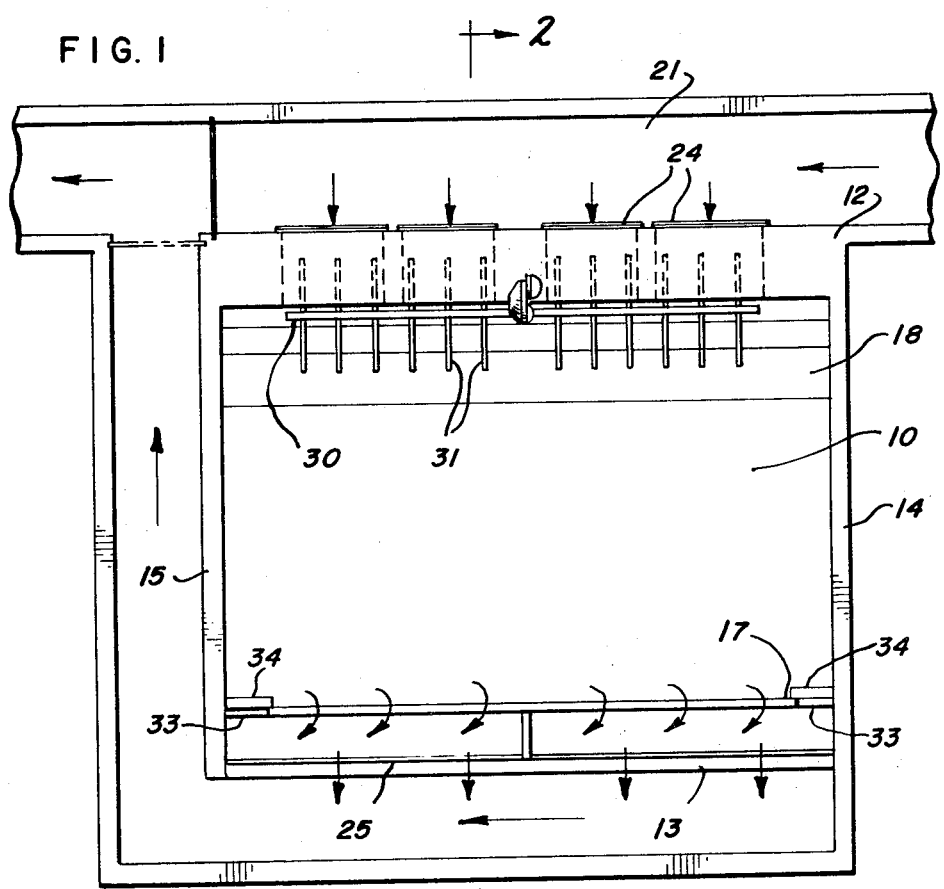
FIG. 1 is a plan view of the tank.

Referring to the drawings, the numeral 10 indicates a tank of concrete or other suitable material. Tank 10 has a bottom 11, side walls 12 and 13 and end walls 14 and 15. The bottom 11 of the tank has a fillet with sloping surface 16 of an angle of the order or about 45° from the horizontal, extending from the wall 13 downwardly to a point below a baffle 17 which is spaced from wall 13 a distance providing a velocity of upward flow of sewage between it and wall 13 which will not carry with it any appreciable quantity of light weight grit, at the liquid inflow volume of the sewage. Bottom 11 extends from the lowermost point of surface 16 in a gentle slope downwardly to a trough 18 which extends along the tank bottom 11 parallel to side wall 12.

At the top of side wall 12, there is a diverging extension 20 which extends interiorly of the tank. Wall 12 is also provided with an influent sewage channel 21 which extends along the entire length thereof.

Extension 20 is adapted with ports 23 which are openings into the tank 10 from the bottom of channel 21. Ports 23 are provided with adjustable gates 24 for control of flow of sewage into the tank.

Liquid in tank 10 is maintained at a substantially constant level, i.e., with little level variation near the top of the tank as by the overflow weir 25 at the top of side wall 13. Liquid overflowing weir 25 is directed to equipment for subsequent processing of the sewage by outlet channel 26.

An air diffusing device, indicated generally by the numeral 30 is placed within the tank with the air diffusion units 31, positioned adjacent to side wall 12 in a horizontal position with individual units extending transverse thereto, a short distance above the trough 18. The air diffusing device may be of a stationary character but it is preferred to use devices which can be elevated out of the tank for servicing such as is described and claimed in the U.S. Pat. to Chase, No. 3,160,685, issued Dec. 8, 1964. The form of air diffuser unit illustrated in the drawing is of the "Swing" type.

Air diffusion device 30 is conventional and need not be described in detail. The introduction of air into the sewage adjacent the side wall 12 of the tank causes a circulatory movement of the sewage about a horizontal axis parallel to wall 12 in a direction initially away from and then back toward the air diffuser units. Grit and other heavy solids in the liquid continuously settle along the sloping bottom of the tank and are "swept" by the liquid into the trough 18. As grit particles are moved toward the trough 18, they are washed substantially free of organic solid matter by the time they reach the trough.

A screw conveyor 32, positioned in the trough 18, may be used to move the accumulated grit to an area from which it can be removed by any suitable means. The screw conveyor may be omitted and the grit removed in any suitable manner.

A baffle 17 extending parallel to the wall 13 has the lower end thereof spaced vertically from the lowermost end of sloping surface 16 and its upper edge above the liquid level of the tank. The baffle extends all the way from wall 14 to wall 15 and the only way any of the sewage can flow over the effluent weir 25 is through the space between the baffle and wall 13.

As raw sewage flows into the tank through inlet ports 23, an equal amount of sewage flows over the effluent weir and into the effluent channel for delivery to other tanks for subsequent treatment.

Scum which may accumulate at the water surface of tank 10 may be directed to the outlet channel 26 through ports 33 adjacent the top of said baffle, said ports having a height adapted for passage of liquid whatever the limited liquid level variation in the tank 10 and scum gates 34 are associated with said ports for control of movement of scum therethrough.

While one embodiment of the invention has been shown and described herein, it will be understood that the description thereof is intended to be illustrative, rather than restrictive, as many details of structure may be modified or changed.

I claim:

1. A method of removing grit from liquid sewage in a tank whose floor terminates in an accumulation zone for solids parallel to and adjacent a first side wall, said sewage containing relatively light organic matter, heavier but relatively small particles of grit and relatively heavy particles of grit, said method comprising flowing said sewage into said tank with uniform distribution along said first side wall positioned transverse to the direction of liquid flow in said tank, introducing air into said sewage adjacent said first side wall and above said accumulation zone for solids with uniform distribution along the length of said side wall in an amount to induce liquid containing light organic matter and light particles of grit of specific gravity greater than said organic matter to flow upwardly initially and then toward a second side wall opposite said first side wall, interrupting the circulator flow and directing it downwardly to the tank floor by a baffle positioned adjacent said second side wall and flowing the sewage under said baffle and upwardly between said baffle and said second side wall for removal by flow over a weir extending the full length of said second side wall.

2. A method according to claim 1 wherein said uniform distribution of sewage in the tank is attained through ports spaced along said first side wall and communicating with the channel extending the length of said inlet wall.

3. A method according to claim 1 wherein scum accumulating at the surface of liquid in said tank and moving in response to the circulatory flow of liquid is directed to the outlet channel by flow through ports adjacent the top of said baffle, said ports being provided with adjustable closure means.

4. An apparatus for removing grit and other particulate solids of relatively high specific gravity from a liquid containing same in suspension comprising a tank having a sloping bottom and a plurality of end and side walls, inlet means spanning the full length of one of said side walls for uniform distribution of influent suspension, a trough in said bottom extending completely along said tank adjacent said side inlet wall, an overflow weir for maintaining a desired level of liquid in said tank extending the full length of and positioned at the top of the side wall opposite said inlet wall, and an outlet for the liquid communicating therewith, means for introducing air into the body of liquid from a region above said trough extending the full length of and adjacent said inlet wall to circulate the liquid in a generally vertical plane in the direction of said overflow weir, and to wash heavy solids which settle out of said liquid along said tank bottom sloping from said outlet wall to said trough, conveying means for removing solids from said trough, a baffle extending completely along said tank parallel to said wall topped by said overflow weir having its upper edge extending above the maximum liquid level and its lower edge spaced adjacent said floor to provide an exit for liquid flow upwardly behind said baffle to said outlet, and a fillet with surface extending downwardly from said side wall topped by said weir to a point below the lower edge of said baffle.

5. Apparatus according to claim 4 wherein ports are provided adjacent the top of said baffle, said ports having a height adapted for passage of liquid whatever the limited liquid level variation in said tank and gates associated with said ports for control of flow of scum therethrough.

* * * * *